United States Patent [19]

Dubbe

[11] 3,716,664

[45] Feb. 13, 1973

[54] SEPARATION COLOR RECORDER SYSTEM WITH RECORDING ON MOTION PICTURE FILM USING LESS THAN A FULL FIELD OF INFORMATION TO RECORD EACH FRAME OF FILM

[75] Inventor: Richard F. Dubbe, Camarillo, Calif.

[73] Assignee: Minnesota Mining and Manufacturing Company, St. Paul, Minn.

[22] Filed: Nov. 12, 1970

[21] Appl. No.: 88,641

[52] U.S. Cl.......178/5.4 CD, 178/DIG. 28, 178/6.7 A

[51] Int. Cl...............................................H04n 5/48

[58] Field of Search...........................178/5.4 CD, 5.2D, 6.7 A, DIG. 28

[56] References Cited

UNITED STATES PATENTS

| | | | |
|---|---|---|---|
| 2,878,309 | 3/1959 | Christensen | 178/6.7 A |
| 2,600,868 | 6/1952 | Hales | 178/5.4 CD |

OTHER PUBLICATIONS

"Shrinking World Gets Video Translator" pages 108–111, February 6, 1967, Electronics.

*Primary Examiner*—Robert L. Griffin
*Assistant Examiner*—Donald E. Stout
*Attorney*—Smyth, Roston & Pavitt

[57] ABSTRACT

A system to provide for the production of standard motion picture color film from a color video signal or color information composed of color components. The color video signal is decoded into its separate green, red, and blue components which components form a repeating color group. Each repeating color group includes individual colors from a single color field through the use of delay. The delay of the individual colors may be in time and with a recording of the repeating color group by the use of a single gun continuous film motion electron beam recorder on a black and white separation master. The delay of the individual colors may be in space and with the recording on the black and white separation master accomplished through the use of a three gun continuous film motion electron beam recorder. The color video signal occurs at 60 fields per second (50 fields per second in particular locals) but the black and white separation master is recorded at 72 frames per second (75 fields per second in the particular locals) so as to provide for a conversion from the 60 or 50 field per second video signal to a 24 frame per second color film. The color film is made from the separation master by exposing each frame of the color film using appropriate color filters in sequence to three frames on the black and white separation master representing the green, red, and blue separation images.

29 Claims, 18 Drawing Figures

INVENTOR:
Richard F. Dubbe
By Smyth, Roston & Pavitt
ATTORNEYS

INVENTOR:
Richard F. Dubbe
By Smyth, Roston & Pavitt
ATTORNEYS

INVENTOR:
Richard F. Dubbe
By Smyth, Roston & Pavitt
ATTORNEYS

INVENTOR
Richard F. Dubbe
By Smyth, Roston & Pavitt
ATTORNEYS

INVENTOR:
Richard F. Dubbe
By Smyth, Roston & Pavitt
ATTORNEYS

SEPARATION COLOR RECORDER SYSTEM WITH RECORDING ON MOTION PICTURE FILM USING LESS THAN A FULL FIELD OF INFORMATION TO RECORD EACH FRAME OF FILM

The present invention is an improvement on the separation color recorder systems disclosed in application for patent U. S. Ser. No. 10,390, filed Feb. 11, 1970 in the name of John W. Reeds, Jr. and application for patent U. S. Ser. No. 69,795, filed Sept. 4, 1970 in the names of Richard F. Dubbe and John W. Reeds, Jr. and with both applications assigned to the same assignee as the instant application. The present invention provides for an improved method of recording a color motion picture film from a color video signal and provides for the elimination of both color fringing and motion irregularity.

The separation color recorder system of the present invention provides for the recording of color video signals or other color information by its separate green (G), red (R), and blue (B), components on a standard black and white film to form a black and white separation master. The separate color components are recorded successively on individual frames where each successive frame represents one field of a particular one of the particular color components of the color video signal. Specifically, the green, red, and blue components form a repeating group where each group includes all three colors from a single color field.

Specifically, for one embodiment of the invention used with a 60 or 50 field per second color video signal, the color group is composed of sequential fields of the various color components in the following order; green red, and blue. It is to be appreciated that a different order may be used and that the particular order described with reference to the present invention is illustrative only. This color group is repeated and is formed into a field sequential signal wherein each field represents a single color component of the color video signal and wherein the fields are sequential so that the recording may be done in real time on a black and white separation master. In order to provide for a conversion between a 60 field per second television rate and the 24 frame per second color film rate the black and white separation master is recorded at 72 frames per second with each color group of three frames used to provide for one color frame on the color film. The color frames are therefore automatically produced at 24 frames per second. Therefore, to convert the 60 field per second or 30 frame per second television video information to the 24 frame per second color film frame, it is necessary to eliminate the equivalent of one-fifth of the television fields for interlaced full field recording or three-fifths of the television fields for non-interlaced or suppressed field recording. It is to be appreciated that in those particular locals where the television field rate is 50 fields per second, the black and white separation master may be recorded at 75 fields per second. Since three frames of the black and white separation master is used to record one frame of the color film, the color film is recorded at 25 frames per second. The difference between the standard frame rate of 24 frames per second and 25 frames per second is not noticible to a viewer.

In the one embodiment of the invention and for 60 field per second television signals the black and white separation master is recorded with a single gun continuous film motion recorder. Two of every five of the fields of color information is used and the black and white separation master is recorded at 72 frames per second. For 50 field per second television signals every other field is used and the black and white separation master is recorded at 75 frames per second. Two of the three color components from each field is delayed so as to have all of the color components in each color group from the same TV field. Since there would not be sufficient time to record a ful TV field when the horizontal scan rates are identical and when the separation master is recorded at 72 or 75 frames per second and the color information occurs at 60 or 50 fields per second, a portion of the picture information at the top and bottom of the picture is discarded. The delay for the color components may be accomplished through the use of various types of delay means such as delay lines, storage tubes, digial stores, and in a specific described embodiment of the invention, the delay is produced using a video disc recording and reproducing system. As a further modification to the one embodiment of the invention and for 60 field per second television signals, a full interlaced television video signal may be reproduced wherein four of the five video fields are used to produce six black and white separation frames. For 50 field per second television signals all of the fields are used to produce the black and white separation master frames.

Another embodiment of the invention uses a three gun continuous film motion recorder wherein all three color components forming a color group are recorded on the black and white separation master at the same time. This embodiment of the invention may also be recorded with suppressed field or full interlace information.

In some of the embodiments of the prior applications referred to above, three successive color fields were used at times to provide for the successive frames on the black and white separation master. One problem that does occur with these embodiments is color-fringing since each frame of color film contains color components from three different fields of video information and when there is relative motion between the camera and the subject matter the color components are not in alignment in the frames of color film. In order to eliminate this color-fringing it is desirable to use color components for each color frame wherein the color components are from the same field of video information. This may be accomplished in the present invention using a delay for two of the colors so that the black and white separation master is recorded using color components from the same video field. For example, a magnetic video disc recording and reproducing system may be used to economically provide for the time-delay since it may be difficult to produce delay lines for one or two video field delay at a reasonable cost.

As an alternative for the elimination of the color fringing, the present invention may also use a three gun recording system so that three successive frames on the black and white separation master representing the color components may be recorded at the same time form a single color field.

Another problem which existed with some of the embodiments of the prior applications referred to above is motion irregularity when the color film is replayed. This occurred since in some of the embodiments, particular ones of the color groups would be repeated in printing the color frames. Each time a color group is repeated to produce more than one color frame, a slight irregularity is produced in the motion. This irregularity is most apparent on pan and zoom shots of the camera. The prior art applications provided for the smoothing out of this irregularity through the use of an increase in the number of color groups that were repeated but still this motion irregularity may be objectionable to some viewers. The present invention eliminates this motion irregularity since each frame of color film represents a sequential point in time and there is no repeating of a color group to produce more than one frame of color film.

The prior art applications referred to above, provided for the double use of particular ones of the color groups in order to provide for the conversion from the television field rate to the color film frame rate. The present invention provides for the conversion in the recording of the black and white separation master at 72 or 75 frames per second and with the information used to record the black and white separation master provided from the television vision video signal which occurs at a 60 or 50 field per second rate. The black and white separation master is used to print the color film on a frame by frame basis wherein each color frame is exposed in sequence to green, red, and blue separation images using appropriate color filters in combination with the separation master. The original separation master may be either a negative or a positive and the color film printed from the separation master may also be either a color positive or a color negative. This allows extreme flexibility in the recording system of the present invention to provide either color positive or color negatives depending on their ultimate use.

The separation color recorder system of the present invention and the prior applications referred to above meet a particular need for a system for converting a color video signal or a color information signal to color film. The prior art systems have included systems which photograph a cathode ray tube so as to provide for color film from a color video picture on a cathode ray tube, or from three black and white cathode ray tubes, each responding to a different color component. Such a system give a grainy picture which is objectionable and is, in a sense, equivalent to the old kinescopes. Other prior art systems for recording video signals on film do not actually produce motion picture film in a conventional sense so that the motion picture film can then be projected through an ordinary projector. For example, an electron beam recorder has been used to record a color video signal using a black and white film, but the signal is recorded in code form and is not on motion picture film which can be used for projection through a normal motion picture projector.

The present improved separation color recording system has several advantages over the prior art system as indicated above. For example, in the present invention, the recording of the color video signal is accomplished on a black and white separation master and is accomplished in real time so that the recording may be live as well as from video tape. Since the separation master is on black and white film, the separation master is a permanent recording which is not subject to dye color fading.

Another advantage with the improved separation color recording system of the present invention is that the system includes inherent color registration since all images are recorded with the same electron beam or one of three electron beams on the same film. Also any non-linearities would match for all of the color fields and any film shrinkage would also tend to be equal on all of the color films which are recorded on the black and white separation master. In addition, since all of the separation images are on the same film there is minimum indexing problem in printing.

Other advantages in the general system of the separation color recording are the recording with an electron beam so as to allow the use of fine grain film. All of the recording can be done with adequate energy so that fine grain film may be used throughout, thereby avoiding the grainy low resolution image characteristic of high-speed film.

Editing of the separation master may be accomplished without upsetting the color sequence merely by removing any of the color groups. Another advantage is that the separation images allow for independent control in printing all three colors thereby allowing for optimal color balance in the printing.

The present invention also has advantages over the systems described in the prior applications referred to above. Specifically, the present invention provides for the elimination of color fringing and in addition provides for the elimination of motion irregularity.

A clearer understanding of the invention will be had with reference to the following description and drawings wherein FIG. 1 illustrates a first embodiment of the invention providing a black and white separation master recorded at 72 frames per second from a video signal occurring at 60 fields per second;

FIG. 2 discloses in more detail the method used in the embodiment of FIG. 1;

FIG. 3 illustrates the embodiment of FIG. 1 using a video disc as the delay system;

FIGS. 4 (*a*), 4 (*b*) and 4 (*c*) illustrate wave forms which are used for the vertical deflection in the system of FIG. 3;

Figure 8:
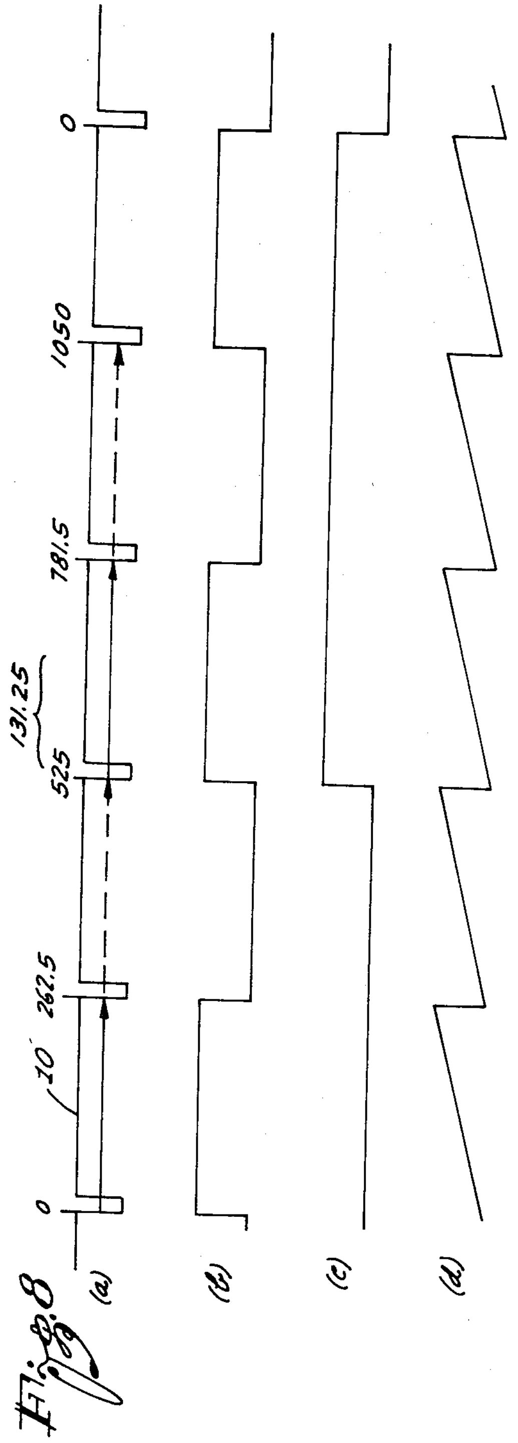
Figure 7:
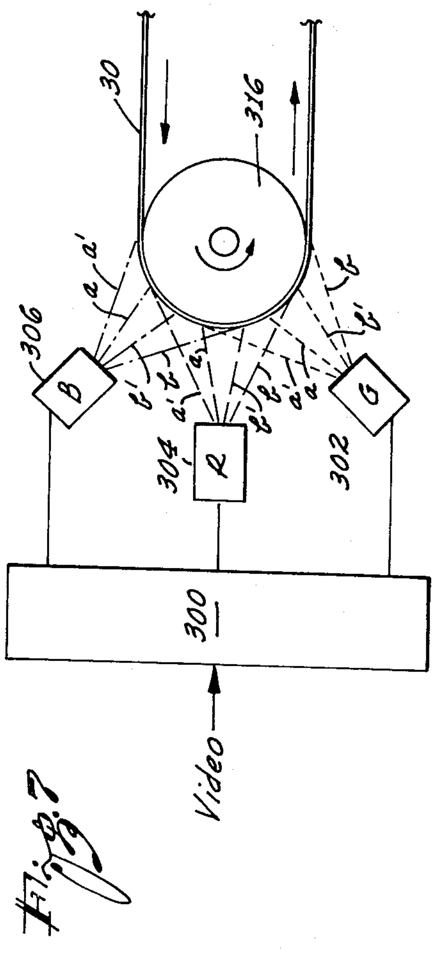
FIG. 7 illustrates a further modification of the system of FIG. 6 including a full field three gun recording system.
Figure 9:
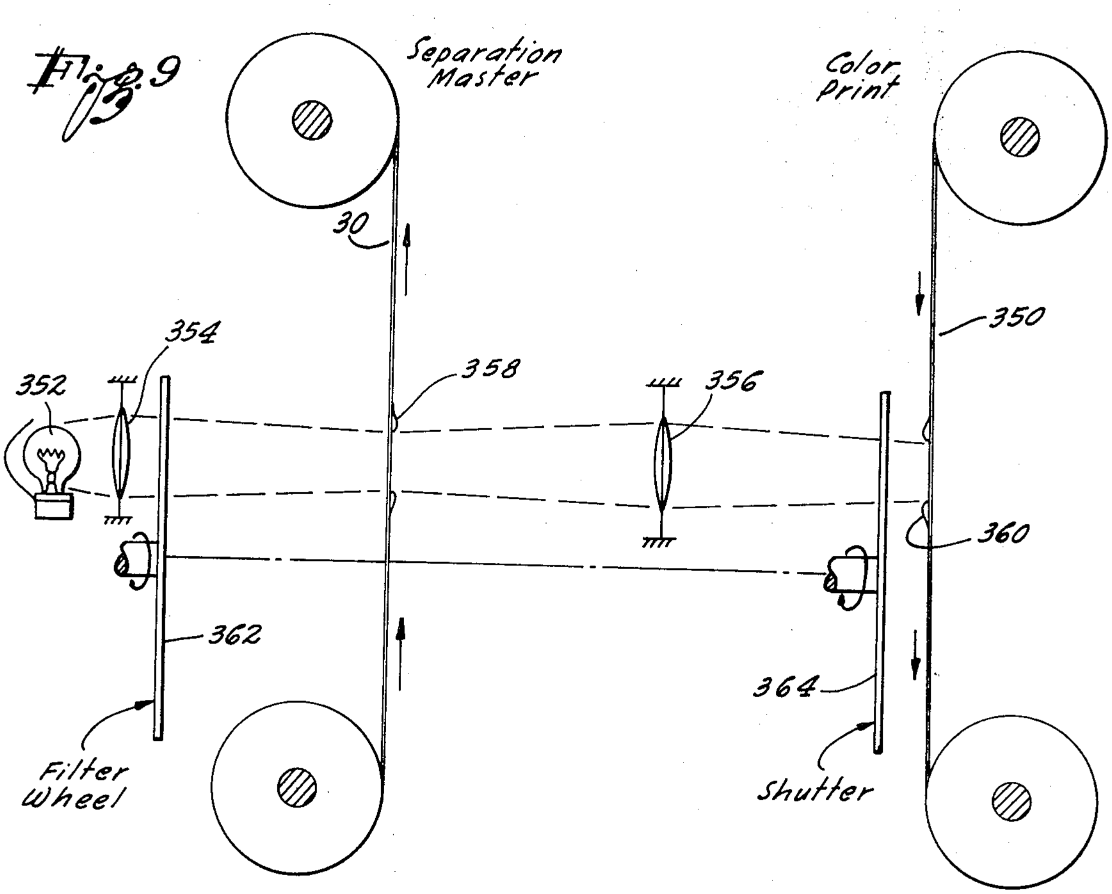
Figure 9A:
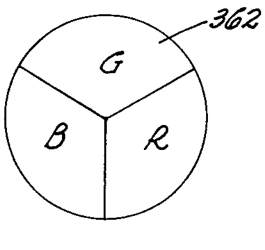
Figure 9B:
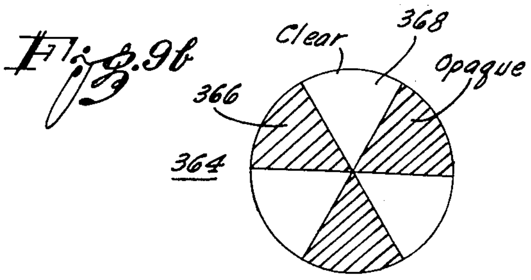
Figure 10:
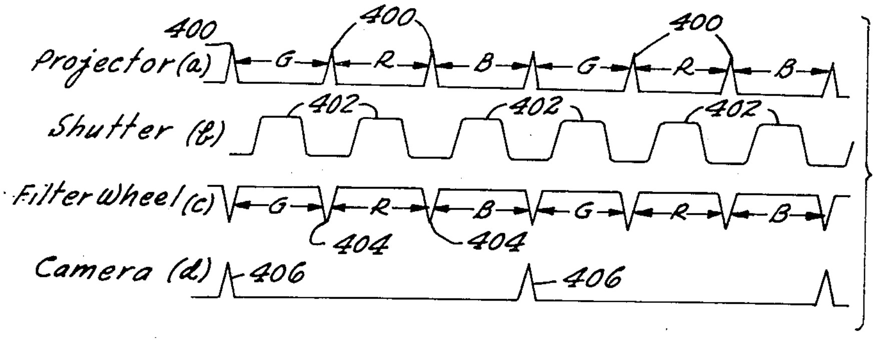

FIGS 8, 8(*a*), 8(*b*) 8(*c*), and 8(*d*) illustrate various wave forms relating to the vertical displacement for the system of FIG. 7;

FIG. 9 illustrates a color printer for providing for a color film from the black and white separation master;

FIGS. 9(*a*) and 9(*b*) illustrate in more detail the filter wheel and shutter of FIG. 9; and FIG. 10 illustrates the stepping sequence for the various components of the color printer of FIG. 9.

Figures 1, 2:
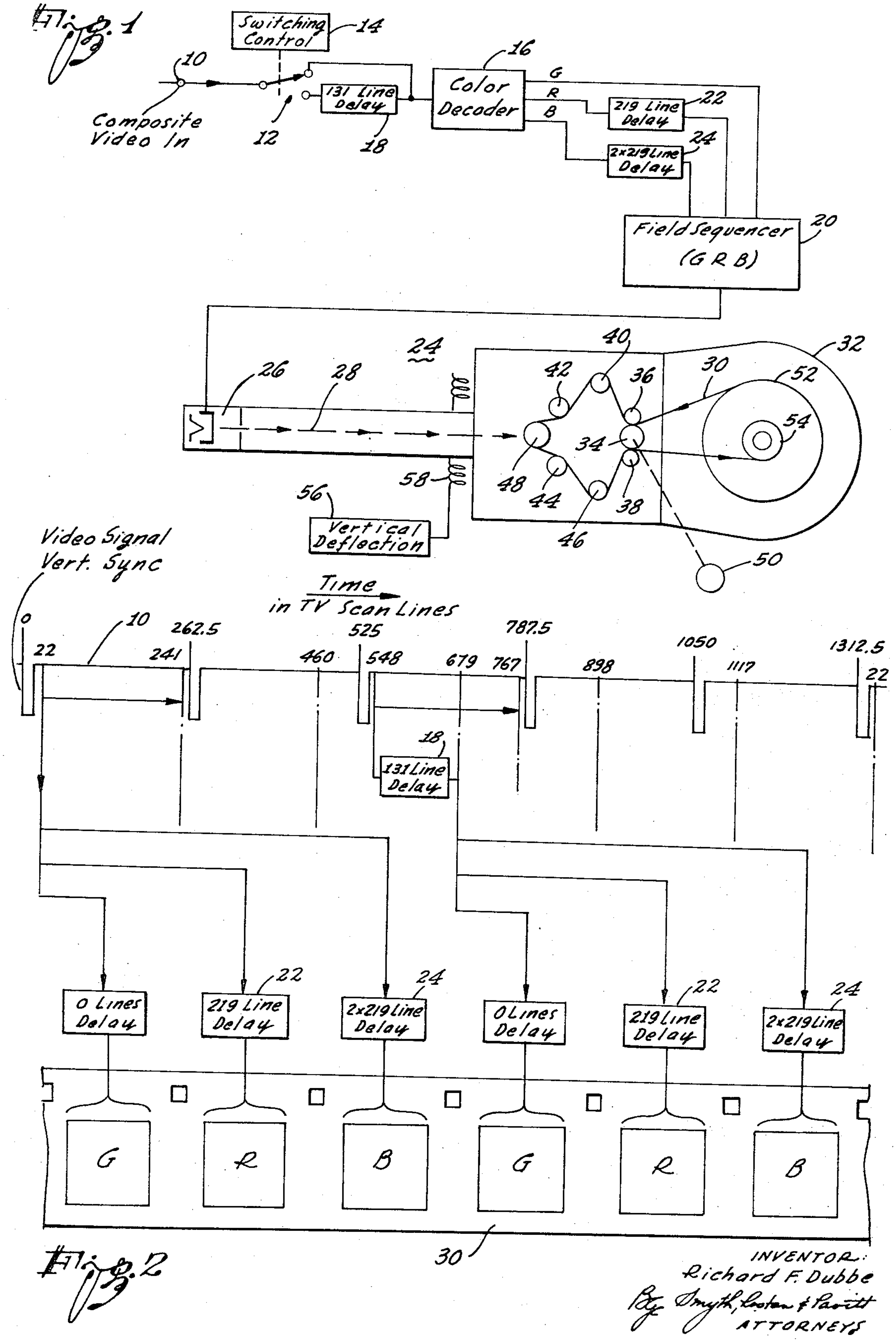

In FIG. 1 a block diagram of a color recorder is shown which color recorder produces a black and white separation master from color information occurring at 60 fields per second. It is to be appreciated that a similar system is used for color information occurring at 50 fields per second . Specifically, an encoded video signal is applied to a terminal 10, which signal may be from a color camera or one that has been previously recorded on video tape. The video signal is applied to a switch 12 which switch is controlled by a switching control unit 14.

The switch 12 under the control of the switching control unit 14 allows the video signal to be either applied directly to a color decoder 16 or to be applied to the color decoder 16 through a delay means 18 having a delay of approximately 131 lines. The color decoder 16 decodes the color video signal into its separate green, red, and blue components and basically is the same type of circuitry used in every home color television set. The green, red, and blue signals are then applied to a field sequency 20, either directly, in the case of the green signal, or through delay means 22 and 24 in the case of the red and blue signals. Specifically, the red signals may be delayed approximately 219 lines by the delay means 22 and the blue signal may be delayed 2 × 219 lines by the delay 24.

It is to be appreciated that color matrix or masking amplifiers may be used in the system of FIG. 1 to select a new set of coordinates depending upon the characteristics of the color film which will ultimately be printed from the separation master. Also gamma amplifiers may be used to correct for the slope of the intensity characteristics of the different color components so as again to correct for the characteristics of the color film.

The field sequencer 20 provides for a sequential field signal having repeating color groups, which color groups include one each of the three color components. Since the red and blue signals are delayed by particular periods of time, all three color components in each color group are from the same video field, so as to eliminate color fringing.

The sequential field signal from the field sequencer 20 is applied to an electron beam recorder 24. The recorder includes an electron gun 26, which gun produces an electron beam 28 directed to a black and white film 30 contained within a film magazine 32. Specifically, the black and white film 30 is driven continuously, using a sprocket 34 and rollers 36 and 38 and the path of the film 30 is controlled by idler rollers 40, 42, 44 and 46. In addition, an idler roller 48, having a larger diameter is used and the electron beam 28 actually records information on the black and white film 30 as it is passing over the idler roller 48. The sprocket 34 is driven by a motor 50, at a speed so that the film 30 moves at a rate of 72 frames per second. The video information occurs at the standard rate of 60 fields per second so that the recording of the black and white master separation 30 at 72 frames per second provides for a conversion between the TV field rate of 60 fields per second and the color film rate of 24 frames per second. This conversion occurs since three forming a color group on the black and white separation master are used to provide for a single frame of color film in a manner to be explained at a later portion of this specification.

The film 30 is driven from a first reel 52, and taken up by a reel 54; the reels are shown to be on the same axis but it is to be appreciated that the specific arrangement of the reels within the magazine 32, may take many forms and is not limited to that shown in FIG. 1. The electron beam recorder 24 provides for a continuous movement of the black and white film 30 so that the electron beam 28 is deflected horizontally to provide for the horizontal scan and the film motion of the black and white film 30 provides for the basic vertical scan. In addition, a vertical deflection circuit 56, may be used to provide for vertical deflection through the use of deflection coils 58. This deflection will be explained at a later portion of the specifications with reference to FIG. 4.

It can be seen therefore, that the color recorder of FIG. 1 provides for a black and white separation master which separation master has frames which are recorded successively with individual frames representing the color components and formed in color groups and which frames are in accordance with the characteristics of the original color information. The black and white separation master 30 may then be used to produce a color film. In addition, since the black and white separation 30, is recorded at 72 frames per second, the use of color groups of three frames on the black and white separation master to produce one frame of color film provides for the color film being recorded at 24 frames per second which is the standard frame rate for motion picture film.

FIG. 2 illustrates in more detail the method used in the color recorder of FIG. 1. Specifically, in FIG. 2, the video signal 10 is shown to have periodic vertical sync pulses and with 262.5 lines in each field and with each group of two fields forming a complete 525 line standard interlaced television picture. In FIG. 2, five successive television fields are shown to have a total of 1,312.5 lines and with each group of five television fields used to provides six black and white separation master frames. As indicated above, each group of three black and white separation master frames is used to print two color film frames and this, therefore, provides for the conversion from 60 TV fields per second to 24 film frames per second to the color film. This conversion is accomplished without color fringing and with minimum motion irregularity.

The horizontal scan rate of the black and white separation master 30, shown in FIG. 1, is identical to that of the television system. However, the vertical rates are different one being, as explained above, 72 frames per second and the other 60 fields per second. Since each television field contains 262.5 lines, a total of 1,312.5 lines (5 × 262.5) are used to scan five television fields. Since we wish to provide six separation frames from these five television fields, each separation frame contains less than a full picture, or 218.75 lines or 1,312.5 lines divided by 6. This is true for the suppressed field mode of recording and the non-suppressed field form of recording will be explained at a later portion of the specification.

The loss of this information is not serious since only 245 lines are actually active picture elements in a television field with the rest of the lines occurring during the vertical synchronization interval. Therefore, only 245 minus 219, or 26 lines of picture information out of 245 lines are discarded which is approximately 5 percent from each edge of the television raster. This can be seen in FIG. 2 where we use the information in the first frame from lines 22 to 241 to provide for three separation master film frames. The green information is recorded directly; the red information undergoes a delay of 219 lines, and the blue information undergoes a delay of 2 × 219 lines. This is to insure that all three frames forming the color group are from the same TV field.

For the next color group of three black and white frames representing the three color components we use the third TV field. It can therefore, be seen that two out of every five TV fields are used to provide for the six black and white frames. Since it takes a total of approximately 656 lines for each color group of three black and white frames to be recorded, the third TV field would occur at a time earlier than desired for the recording of the next color group. Therefore, the additional delay of approximately 131 lines forming the delay means 18 is used for all three of the frames forming the second color group. For the 50 field per second system the additional delay means 18 is not necessary since every other field is used.

Figures 3, 4:
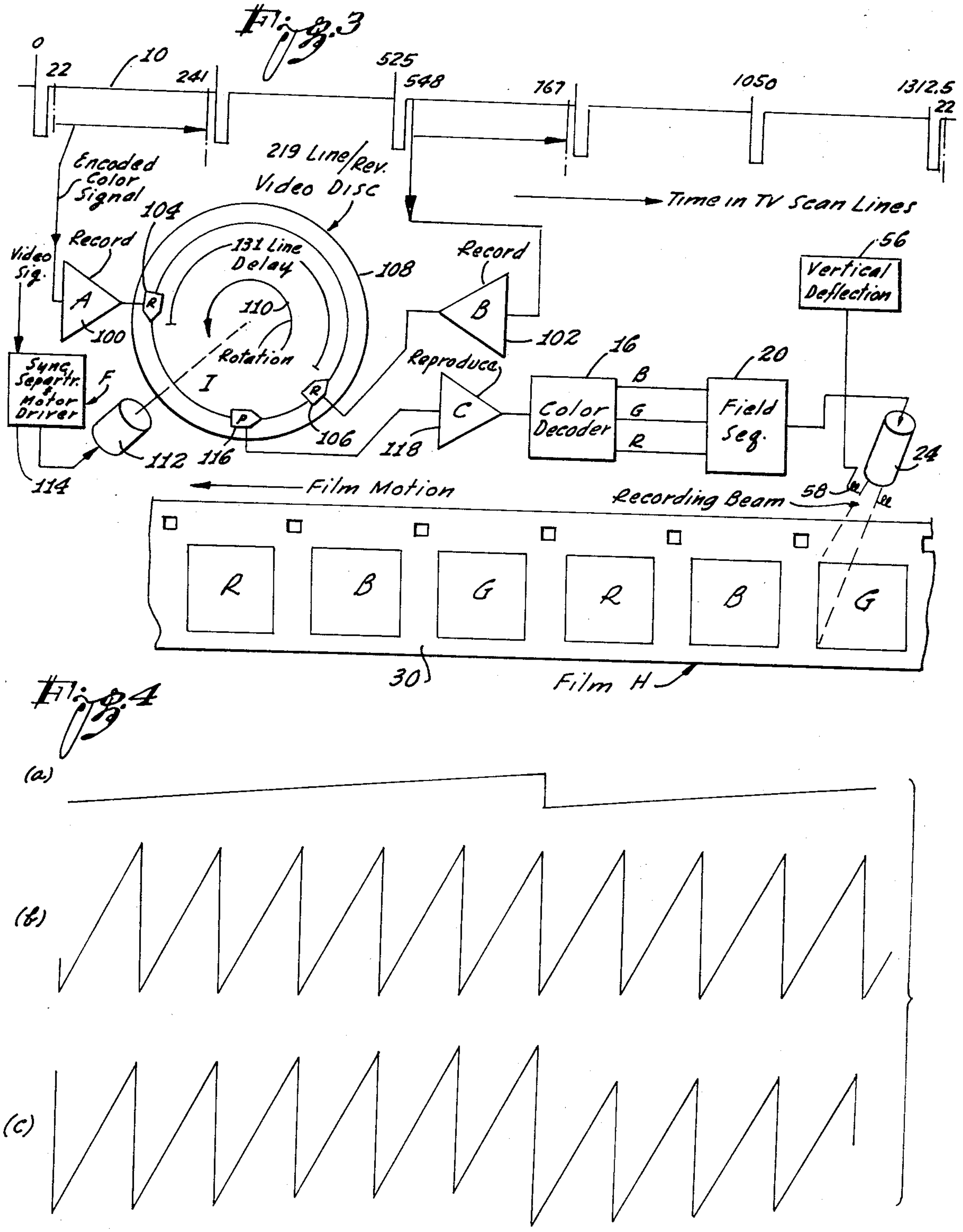

A specific system using a video disc delay means for the various delays illustrated in the system of FIGS. 1 and 2 is shown in FIG. 3. In FIG. 3, the video signal 10 is provided to a pair of record amplifiers 100 and 102. Specifically, the first field in each group of five television fields is provided to the record amplifier 100 and the third field in each group of five television fields is provided to record amplifier 102. A pair of recording heads 104 and 106 are used for recording information on a single track of a magnetic video disc 108 and specifically recording head 104 receives information from recording amplifier 100 and recording head 106 receives information from recording amplifier 102. The video disc rotates in a counter-clockwise direction, as shown by the arrow 110 and the video disc is rotated by a motor 112. The motor is controlled by a signal from a sync separator and motor driver 114, so as to insure that the video disc 108 revolves in synchronism with the television sync signal. A playback head 116 plays back the information on the video disk 108 and supplies such information to a reproducing amplifier 118. The output from the reproducing amplifier 118 is supplied to the color decoder 16 which in turn supplies the separate blue, green, and red signals to the field sequencer 20. The out put from the field sequencer 20 is applied to the electron gun recording means 24 to provide for the recording of the successive frames on the black and white separation master 30.

Returning to the video disc 108, the video disc rotates at a particular speed determined by the sync separator and motor driver 114 and at that particular speed the record heads 104 and 106 are positioned so that a delay of approximately 131 lines of video information separate the record heads. The disc itself is capable of recording a total of 219 television lines in one revolution of the disc. The playback head is located a quarter disc revolution from the record head 104, or approximately 54 lines of information between the record head 104 and playback head 116.

The operation of the system of FIG. 3 is as follows: When line 22 of the first field of video information 10 arrives, the record head 104 as driven by the recording amplifier 100 begins to simultaneously erase previous information and record the encoded color television signal on the video disc starting at scan line 22. At approximately 54 lines later, or one-quarter of a disc revolution, the reproduce head 116 reproduces the information recorded by the record head 104 and supplies such information to the reproduce amplifier 118. The color decoder, 16, decodes this information and the field sequencer 20 is in a position to pass the green information to the electron beam recording means 24 to record the green color component as a frame on the black and white separation master 30. The field sequencer 20 advances between the green, red, and blue color components with an advance occurring after each revolution of the video disc 108. The electron beam recording 24 uses the well-known line scan mode where the film 30 is moved continuously so as to supply the basic vertical deflection of the raster and the beam is swept in a cross-wise or horizontal raster scan direction.

The field sequencer 20 remains in the position to pass on the green information for one disc revolution and the electron beam records one separation master film frame of green image density information. The recording cycle, for the recording of the information in the first television field is de-energized by de-energizing the recording amplifier 100 after scan line 241. However, the video disc 108 and the playback head 116 and reproduce amplifier 118 continue to playback the recorded track of information for a second and third time, so that the field sequencer 20 may supply red and then blue information to the electron gun recording means 24. In this way the black and white separation master 30 is recorded with three successive frames representing the individual color components, which group of three frames form a color group.

While the blue signal is being recorded on the black and white separation master, the record head 106 is energized by energizing amplifier 102 so as to record video information on the video disc 108 starting at line 548 since the record head 106 is positioned 131 lines before the record head 104, the signal recorded by the record head 106 will be delayed 131 lines before it reached the playback head 116. Therefore, the signal recorded by the recording head 106 is delayed 131 lines in playback when compared to the signal recorded by the record head 104. As soon as the electron gun recording means 24 has recorded the blue frame of information which was recorded by record head 104, it will be immediately followed by green information recorded by record head 106.

The video disc 108 is then revolved sufficient number of times to provide for the recording for green, red, and blue frames of information from the third field of the color television signal 10. Specifically, lines 548 to 767 of the third field of the group of five fields of the video signal 10, is used to record the second color group on the black and white separation master. At line 1312.5 the entire five television field sequence starts again and the process continues to be repeated to provide for continuous recording of the black and white separation master. It is to be appreciated that a variety of magnetic video disc delay systems are possible. For example, the green, red, and blue information may be decoded prior to disc recording and be stored as separate color information on independent disc tracks. Also the disc may turn at various speeds with one mode being even multiples of the storage time such as N times 219 lines per revolution. Another mode is where the disc simply provides time delay and speed is not a multiple of the line rate and the head spacing is adjusted for the proper delay.

The system of FIG. 3 also includes a vertical deflection circuit 56, controlling vertical deflection coils 58. This vertical deflection is important in that it is used to generate frame line spaces on the separation master film and to position each frame raster at exactly the same spacing on the film. This deflection is desirable since for practical purposes the line-switching means should turn on and off during the horizontal blanking period. In an examination of the timing sequence shown in FIG. 2, it is noted that the total lines of 1312.5 divided into 6 frames on the black and white separation master, provide for 218.75 lines as the uniform line storage increment. Since it would be difficult to provide for a fractional line recording on a video disc and since six times 219 lines, which is the line storage of the video disc, equals 1314 lines, the last blue image recorded on the film 30 will be vertically displaced from its proper position by 1314 minus 1312.5 or 1.5 lines. This displacement can be compensated by introducing a small, saw-toothed wave deflection to displace the image in the direction of film motion. Such a small saw-tooth wage deflection is shown in FIG. 4(*a*).

In addition, it is desirable to compress each image to leave a frame space between images to establish a standard aspect ratio. Such a deflection may be accomplished by a suitable saw-tooth wave deflection shown in FIG. 4 (*b*). The total deflection signal provided by the vertical deflection circuit 56 to the deflection coils 58 is therefore shown in FIG. 4(*c*) and may be seen to be a complex wave form which is produced by the combination of the deflection wave forms of FIGS. 4(*a*) and 4 (*b*). This complex wave form may be thought to have a short saw-tooth providing the image compression superimposed on a long saw-tooth providing the vertical displacement error compensation. The deflection wave forms should have a relatively short retrace time to avoid losing picture information at the top and bottom of the film frame.

Figures 5, 6:
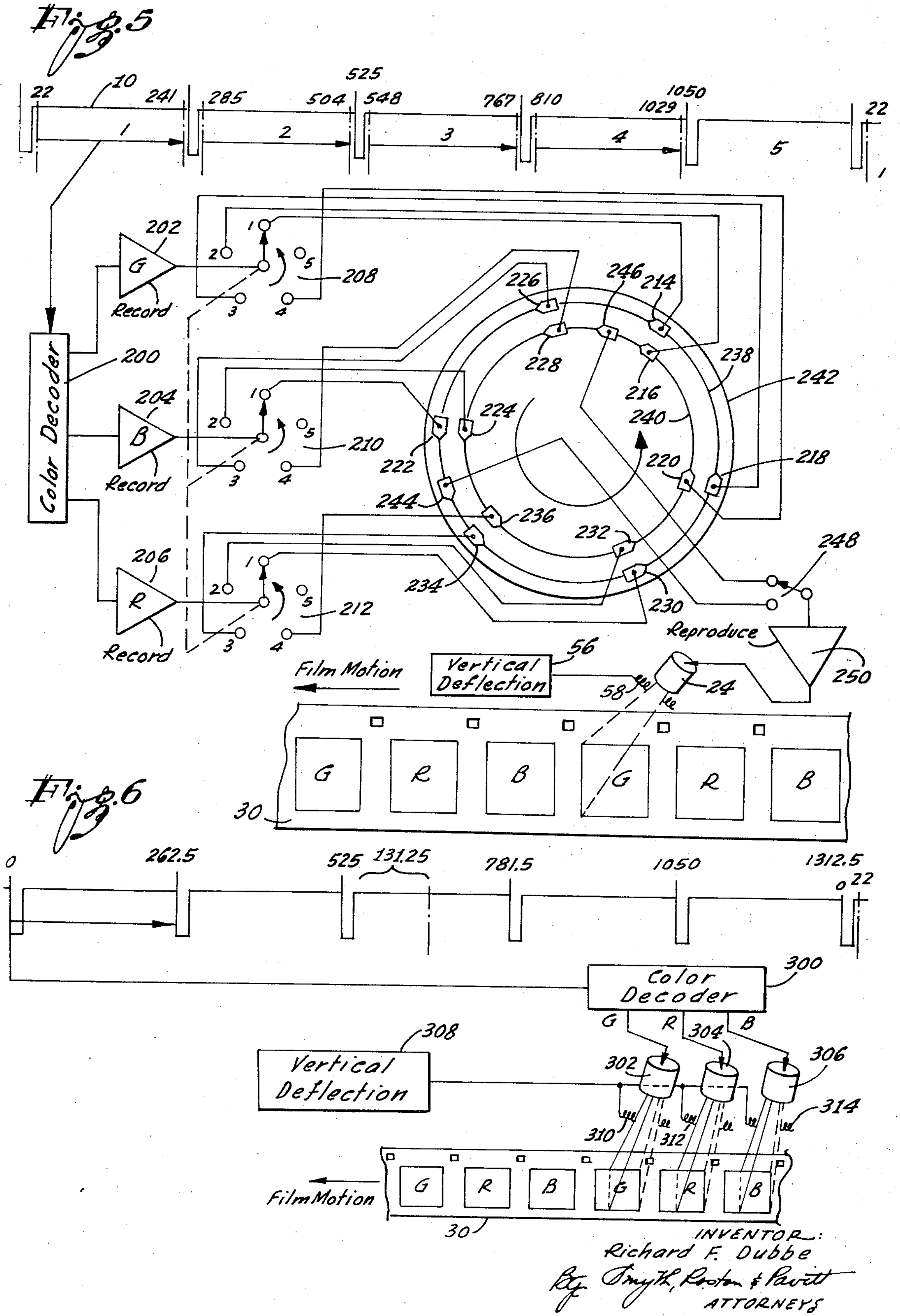
FIG. 5 illustrates a further modification of the system of FIG. 1 and specifically includes full field recording using a video disc delay system.
FIG. 6 illustrates a second embodiment of the invention including three gun recording so as to provide for spatial displacement.

The previous described embodiments of the invention operate in the suppressed field mode where only one television field is recorded on each separation master film frame. It is desirable to have full resolution by recording both the even and odd line television fields on each film frame so as to produce a fully interlaced recording on each film frame. FIG. 5 illustrates full field recording by vertically deflecting the height of one film frame as in conventional interlaced raster canned television and by recording fields 2 and 4 out of each group of five fields. In addition FIG. 5 illustrates a full field time delay through the use of a 3 × 219 line or 687 line disc delay.

In FIG. 5 five fields of the video signal 10 is shown and with the first four of such five fields used to provide for the recording of the information on the black and white separation master 30. The video signal 10 is applied to a color decoder 200 which separates the video signal into its component colors and which component colors are separately applied through recording amplifiers 202, 204 and 206 to sequential switchers 208, 210 and 212. It can be seen that the switches are operated in unison and that each switch contains five switch terminals numbered 1 through 5 which correlate to the five fields of the video signal 10.

The output from the switches 208, 210 and 212 are applied to a plurality of recording heads 214 through 236 arranged along two tracks 238 and 240 of a video disc 242. The video disc revolves at a particular speed and provides for recording at that speed of a maximum of 3 × 219 lines or a recording capability of 687 lines of video information. The information recorded on the tracks 238 and 240 are reproduced by reproducing heads 244 and 246 and are applied through a high frequency sampling switch 248 to a reproduce amplifier 250. The reproduce amplifier 250 feeds a single gun electron beam recorder 24 to provide for the recording of the information on the black and white separation master 30. Also included are a vertical deflection circuit 56 controlling the vertical deflection of the beam from the electron gun recording means 24 through the use of defection coils 58.

In the operation of the system of FIG. 5 the video information 10 is applied through the color decoder 200 and the recording amplifiers 202, 204 and 206 to the switches 208, 210 and 212. Assuming that the information from field one of the video signal 10 is first applied to the color decoder 200, the switches 208, 210 and 212 are in their first position and the separate color components are recorded on the track 238 at spaced positions using recording heads 214, 222 and 230. These three recording heads are each spaced 219 lines from each other. During the second field of the video signal 10 of the switches 208, 210 and 212 are moved to their second position so as to provide for the recording of the second field on the track 240 through the use of recording heads 216, 224 and 232. When the third field of video information 10 occurs the switches 208, 210 and 212 are in their third position and recording is produced on track 238 through the use of recording heads 218, 226 and 234. The fourth field of video information 10 is recorded on the track 240 through the use of recording heads 220, 228 and 236.

The recording of the fields 3 and 4 of the video information 10 is delayed in time approximately 131 lines relative to the recording of fields 1 and 2 of the video signal 10. This delay is accomplished through the proper spacing of the various recording heads on the video disc 242. This delay is the same as that used in the system of FIG. 3 and also the recording of information is similar to that of FIG. 3 in that a portion of the signal is discarded from each edge of the raster. When the system of FIG. 5 is used for 50 field per second television signals the additional delay of 131 lines is not necessary since all of the fields are used.

The switches 208, 210 and 212 are revolved to be in a fixed position during each field of video information and with one blank position so as to allow for the proper conversion from the video field rate to the motion picture frame rate. Specifically, while the video information 10 occurs at 60 fields per second the film motion for the black and white separation master 30 is at 72 frames per second so that when each group of three black and white frames is used to print a single color frame the color film will be at the proper frame rate of 24 frames per second.

The reproduction of the information on the two tracks 238 and 240 of the video disc 242 is accomplished using the reproduced heads 244 and 246. These heads continuously reproduce the information on the tracks 238 and 240 and with that information successively presented to the electron gun recording means 24 from the produce amplifier 250. In order to provide for the full field recording the high frequency sampling switch 248 switches between the information on the two tracks 238 and 240.

The vertical deflection circuit 58 provides for the deflection in the same manner as that described with reference to FIG. 3 and 4. In addition, it is common practice to provide a vertical deflection so that the electron beam recording is not along a straight horizontal line but rather is wobbled to either side of a medium horizontal line. This provides an improved recording of the video information. Since this capability exists in normal electron beam recorders the high frequency sampling switch 248 operates in synchronism with this vertical deflection or wobble and provides for the recording at one extreme point of the electron beam of the information on one of the tracks of information and provides for the recording at the opposite extreme position of the recording beam of the information on the other of the tracks of information on video disc 242. The reproduce heads 244 and 246 are spaced so that the information from the first and second fields is presented to the switch 248 at the same time and in a similar manner the information from fields 3 and 4 video signal 10 is also presented to the switch 248 at the same time. In this manner the effect of a full interlaced television picture is reproduced on the black and white separation master.

FIG. 6 illustrates a further embodiment of the invention for achieving the frame conversion from 60 or 50 TV fields per second to 72 or 75 black and white film frames per second that avoids the use of video storage or delay device. The embodiment of FIG. 6 delays the information in space by providing a displacement along the film instead of in time as with storage devices.

In FIG. 6 the video information 10 is fed to a color decoder 300 which separates the video signal into its three component colors. The individual colors are fed to three electron beam recorder devices 302, 304 and 306. Each of the electron beam recording devices records information on a successive frame along black and white separation master 30 and with each frame recorded in response to a particular one of the color components. A vertical deflection circuit 308 provides vertical deflection signals to deflection coils 310, 312 and 314 which control individual ones of the electron beams. Assuming first that the system of FIG. 6 is operating in the suppressed field mode, the general operation of the system of FIG. 6 would be as follows:

The black and white film 30 is moved continuously and at line 0 of the video signal 10 all three beams are energized to line scan the green, red and blue image information on three successive film locations. This scanning continues until the end of the first TV field which is at line 262.5. In the suppressed field mode of recording the second field is ignored and the film continues to advance until line 525 when the energy beams are again activated. However, at this time the energy beams are deflected vertically in a direction opposite to the direction of film motion. This vertical deflection places the beams at a second position shown by the dotted lines in FIG. 3 which is approximately 131 line spaces up the film from the original scanning position. This deflection is used for frame conversion to compensate for the information which is discarded. The 50 field per second system does not have need for the vertical deflection. After the vertical deflection, the energy beams line scan the second sequence of three images representing the green, red and blue information. At line 1312.5 which is the end of five fields the entire sequence is repeated. The system of FIG. 6 has the economic advantage of eliminating the video storage means and in addition would no longer be bandwidth limited by the storage means and the system of FIG. 6 can be made to record very high frequency high-resolution information.

FIG. 7 illustrates a modification of the system of FIG. 6 showing the black and white separation master 30 passing over a large idler wheel 316. In addition, the electron guns 302, 304 and 306 are shown to be disposed radially around the film 30 passing over the large idler wheel 316. The electron beams coming from the electron guns 302, 304 and 306 are shown to be disposed in different positions marked, *a'*, *a*, *b'*, *b* and with the same markings for all three beams. These positions represent vertical deflections of the beams so as to provide for a full field recording and in addition to provide for the deflection used to compensate for the frame conversion. This can be seen with reference to FIGS. 8 8(*a*), 8(*b*) 8(*c*) and 8(*d*) which illustrate the video signal 10 in FIG. 8(*a*) and deflection signals are FIGS. 8(*b*) and 8(*c*) and 8(*d*) to provide various compensation. The deflection of FIG. 8(*b*) is shown to be a wave form which varies between an *a* level and a *b* level and such wave form is used to provide for the interlace in the picture to produce a full field recording. This can be seen in FIG. 7 where the beam is deflected from an a position to a *b* position which is a deflection in the direction of motion of the film movement so as to allow the first and second fields to be interlaced. In addition, the wave form of FIG. 8(*b*) provides for the deflection from an *a'* position to a *b'* position to allow for the full interlace between the third and fourth fields of the video signal 10.

FIG. 8(*c*) is the vertical deflection wave form used for the frame conversion. This deflection signal provides deflection of approximately 131 lines backwards so that the recording of the third and fourth fields starts at the proper place in relation to the recording of the first and second fields of the video signal. The value of 131 lines occurs because the film is moving at 72 frames per second and the TV picture is only occurring at 60 fields per second.

FIG. 8(*d*) illustrates a sawtooth wave form so as to compress the information forming each frame which in turn generates frame lines spaces between each frame. This deflection is also in the direction of film motion.

It is to be appreciated that some of the figures used for delays or vertical displacement have been approximate only and that small variations may occur. For example, the actual delay or vertical displacement needed to provide for an exact positioning so as to compensate for the conversion from the TV field rate to the frame rate of the black and white separation master is 131.25 lines. It is also to be appreciated that the specific delay means disclosed are illustrative only in that other delay means may be used. For example, delay lines could be used or storage tube delay means could be used or digital storage delay means could be used. Also the invention has been described with reference to exposing the black and white separation master using an electron beam but it is to be appreciated that other types of film exposure could be used such as cathode ray tube exposure, laser beam exposure or any general form of energy beam exposure.

Once the black and white separation master has been produced using the embodiments of the present invention, it is now possible to provide for the printing of a color film from such black and white separation master. FIGS. 9, 9(*a*), 9(*b*) and 10 illustrate a color printer and method of operation of such color printer to produce a color film 350.

In FIG. 9, the color printer includes a projector having a light source 352, lenses 354 and 356 and in addition, light stops 358 and 360. The projector is used to project the image on the separation master 30 onto the color film 350. The separation master 30 and color film 350 are driven with intermittent film motion in a manner to be described with reference to FIG. 10. Included within the system of FIG. 9 is a filter wheel 362 and a shutter 364 which are driven continuously. All of the driven items such as the filter wheel 362, the separation master 30, the shutter 364 and the color film 350 may be driven in proper phase by a common drive motor.

The filter wheel 362 may be subdivided into three sectors as shown in FIG. 9(*a*) with each sector of a different color. Specifically, as shown in FIG. 9(*a*) and starting at the top and going clockwise, the various sectors have the following colors, green red and blue. The various colors and their particular sequence in the color wheel 362 follow the color components in the successive frames present on the separation master.

The shutter 364 shown in more detail in FIG. 9(*b*) includes opaque segments 366 and clear segments 368. The shutter therefore, provides for the passage of light to the color film wherever a clear segment 368 is in the appropriate position. It can be seen, therefore, that as the filter wheel 362 rotates it provides for light of various colors being transmitted through the black and white separation master and with the light actually transmitted to the color film 350 in accordance with the operation of the shutter 364. The filter wheel 362 and the shutter 364 therefore must be synchronized with the movement of the black and white separation master and the color film so that the proper colors are passed through the black and white separation master to provide for the proper colors in the color film 350. Specifically, when a frame on the black and white separation master 30 appears which represents green information, the green portion of the filter wheel must be in the proper position so that the green light is transmitted to the black and white separation master 30 and toward the color film 350. This, or course, is also true of the other colors represented in the black and white separation master 30.

The specific operation with the various members of the film color printer of FIG. 9 are shown in FIG. 10. Specifically, the stepping of the projector so as to move the separation master 30 is shown in FIG. 10 (*a*), the operation of the shutter is shown in FIG. 10(*b*), the operation of the filter wheel is shown in FIG. 10(*c*) and the movement of the camera or the color film is shown in FIG. 10 (*d*).

The movement of the projector or the separation master 30 is intermittent and as shown in FIG. 10(*a*), the stepping of the separation master is represented by the pulses 400. Specifically, starting with the left hand portion, the projector steps the separation master 30 so as to provide for the green field for projection. At the next step the red field is provided for projection and at the next step the blue field is provided for projection. This sequence of colors is repeated for each color group.

The operation of the shutter is shown in FIG. 10(*b*) and the shutter is open during the periods represented by the pulses 402. It can be seen that the shutter is open only during the period when the separation master is stationary. The operation of the filter wheel is shown in FIG. 10(*c*) and provides for the appropriate segments of green, red and blue so as to correspond to the stepping of the separation master. The filter wheel although rotated continuously provides for the various colored sectors to be presented in turn and with a change from one sector to another represented by the pulses 404. Finally, as shown in FIG. 10(*d*), the cameral steps the film 350 at the positions represented by the pulses 406 and in the remaining interval the color film is stationary.

It can be seen, therefore, that during a particular stationery period for the color film 350, between steps 406, the projector provides for the separation master to have fields corresponding to green, red and blue in stationary positions and whereby light of the proper color is projected from the filter wheel to the black and white separation master and wherein the shutter is open to allow the light to impinge on the color film for each of three color components. At the time the light impinges on the color film, the separation master is stationary and the color film is stationary. The shutter and filter wheel are both rotated continuously but are provided with sufficient overlaps so that no light is transmitted to the color film when either the separation master or the color film is being moved.

The present invention, therefore, provides for a method of converting television video signals representing color information to color motion picture film. The video information occuring at 60 fields per second is recorded as a three color black and white separation master at 72 frames per second. Each group of three colors on the black and white separation master is printed as one color film frame to produce the 24 frames per second color film. Each of the three colors on each color film frame comes from the same point in time in that it comes from the same TV field and problems of color fringing are thereby eliminated. In addition, problems of motion irregularity are eliminated in that the conversion from the 60 field per second television signal to the 24 frame per second color film does not involve the double use of particular ones of the color groups on the black and white separation master. The conversion occurs because 72 separation color successive frames are recorded on the black and white separation master during the time of 60 color television fields, and there is no motion irregularity since there is no double use of information. Although the invention has been described with reference to particular embodiments, the invention is only to be limited by the appended claims.

I claim:

1. A separation color recording system for recording on black and white film fields of color information occuring at a particular field rate and with each field composed of three color components including first means responsive to a particular substantial portion less than a full field of particular ones of the fields of the color information for producing signals, which signals represent individual ones of the color components to be recorded on the black and white film and with the signals formed into color groups and with each color group including information representing the individual color components from the particular substantial portion of the same field, and second means coupled to the first means and responsive to the signals for recording successive frames on the black and white film in accordance with the individual color components and with the black and white film recorded at a frame rate different than the field rate for the color information and with the use of less than a full field to produce the signals partially providing for the conversion from the field rate to the frame rate.

2. The separation color recording system of claim 1 wherein the first means is responsive to a particular substantial portion less than a full field of the particular ones of the fields and wherein the second means provides for a sequential recording of the successive frames of the black and white film and wherein two of the color components from the substantial portion of the particular ones of the fields are delayed relative to the remaining color component of the same field and with the use of less than a full field to produce the signals partially providing for the conversion from the field rate to the frame rate.

3. The separation color recording system of claim 1 wherein the second means provides for a recording at the same time of the successive frames of the black and white film.

4. The separation color recording system of claim 1 wherein the field rate for the fields of color information is 60 of 50 fields per second and wherein the frame rate for the black and white film is 72 or 75 frames per second 5. The separation color recording system of claim 1 wherein signals representing at least the substantial portion of the first and third fields of each group of five fields is used to record six successive frames on the black and white film.

6. The separation color recording system of claim 2 wherein signals representing at least the substantial portion of the first and third fields of each group of five fields is used to record six successive frames on the black and white film and wherein the third field is delayed relative to the first field to complete the compensation of the conversion between the field rate of the color information and the frame rate of the black and white film.

7. The separation color recording system of claim 6 wherein the third field is delayed in time relative to the first field.

8. The separation color recording system of claim 6 wherein the third field is delayed in space along the black and white film relative to the field rate.

9. The separation color recording system of claim 1 wherein signals representing the substantial portion of the first four of each group of five fields is used to record six successive interlaced frames on the black and white film.

10. A system for recording fields of color information occuring at a particular field rate on a single black and white film wherein each field is composed of a plurality of color components, including first means responsive to a particular substantial portion less than a full field of particular ones of the fields of the color information for producing a field sequential signal wherein sequential field represent particular ones of the plurality of color components from the particular substantial portion of the same field and wherein the sequential fields in the field sequential signal are grouped into a continuously repeating color group and wherein each color group consists of one sequential field of each of the color components in the folor information, and second means coupled to the first means and responsive to the field sequential signal for recording on the black and white film frames corresponding to each sequential field in the field sequential signal and with the black and white film recorded at a frame rate different than the field rate for the field of color information and with the use of less than a full field to produce the sequential signal partially providing for the conversion from the field rate to the frame rate.

11. The system of claim 10 wherein two of every five fields is recorded in six successive frames of the black and white film.

12. The system of claim 10 wherein four of every five fields is recorded in six sequential frames of the black and white film and with each group of two successive fields used to provide for an interlaced recording on the frames of black and white film.

13. The system of claim 10 wherein the field rate for the fields of color information is 60 or 50 fields per second and wherein the frame rate for the black and white film is 72 or 75 frames per second.

14. The system of claim 10 wherein the first means is responsive to a particular substantial portion less than a full field of particular ones of the fields of color information and with the use of less than a full field to produce the sequential signal partially providing for the conversion from the field rate to the frame rate.

15. The system of claim 14 at least wherein the first and third of each group of five fields is used to record six successive frames of the black and white film and wherein the third field is delayed relative to the first field to complete the compensation of the conversion between the field rate of the color information and the frame rate of the black and white film.

16. The system of claim 14 wherein at least some of the color components are delayed so that the color components in each color group are from the same field of color information.

17. A system for recording fields of color information occurring at a particular field rate on a single black and white film wherein each field is composed of a plurality of color components, including first means responsive to a particular substantial portion less than one full field of particular ones of the fields of color information for producing a plurality of individual signals representing each of the plurality of color components from the particular substantial portion of the particular ones of the fields of color information, and second means coupled to the first means and responsive to the plurality of individual individual signals for recording at the same time a plurality of successive frames on the black and white film and with each frame recorded in accordance with an individual one of the signals representing one of the plurality of color components and with the black and white film recorded at a frame rate different than the field rate for the color information and with the use of less than full fields to produce the signals partially providing for the conversation from the field rate to the frame rate.

18. The separation color recording system of claim 17 wherein the field rate for the fields of color information is 60 or 50 fields per second and wherein the frame rate for the black and white film is 72 or 75 frames per second.

19. The separation color recording system of claim 17 wherein signals representing at least the substantial portion of the first and third fields of each group of five fields is used to record six successive frames on the black and white film.

20. The separation color recording system of claim 19 wherein the first means is responsive to a particular substantial portion less than a full field of particular ones of the fields of color information and with the use of less than full fields to produce the signals partially providing for the conversion from the field rate to the frame rate and wherein the third field is delayed relative to the first field to complete the compensation of the conversion between the field rate of the color information and the frame rate of the black and white film.

21. The separation color recording system of claim 20 wherein the substantial portion of the third field is delayed in space along the black and white film relative to the field rate.

22. The separation color recording system of claim 17 wherein individual signals representing the first four of each group of five fields is used to record six successive interlaced frames on the black and white film.

23. A system for converting color information occurring at a particular field rate and wherein each field is composed of a plurality of color components to motion picture color film using an intermediate black and white separation master, including first means responsive to a particular substantial portion less than a full field of particular ones of the fields of the color information for producing signals wherein the signals represent individual ones of the plurality of color components and wherein the signals are formed into a repeating color group which color group includes information representing each of the color components in the color information from the particular substantial portion of the same field.

second means coupled to the first means and the black and white separation master and responsive to the signals for recording on the black and white separation master successive frames corresponding to the individual color components and with the black and white separating master recorded at a frame rate different than the field rate for the color information, third means for supporting and providing movement of the black and white separation master, fourth means for supporting and providing movement of the color film, fifth means for directing light energy through the black and white separation master and toward the color film, and sixth means coupled to the third and fourth means for controlling the movement provided by the third and fourth means so that the black and white separation master is successively moved to present the successive frames representing the individual color components of each color group and so that the color film is moved to receive at each frame of the color film the sequential frames representing the color groups, which groups include all of the individual color components of the color information and with the difference between the frame rate for the black and white separation master and the field rate for the color information providing for a recording of the color film at a standard frame rate.

24. The system of claim 23 wherein the color information occurs at 60 or 50 fields per second, the frame rate for the black and white separation master is 72 or 75 frames per second.

25. The system of claim 23 wherein the second means provides for a recording at the same time of three successive frames of the black and white separation master.

26. The system of claim 23 wherein the first means is responsive to a particular substantial portion less than a full field of particular ones of the fields of the color information and wherein the second means provides for a sequential recording of the successive frames of the black and white separation master and wherein two of the color components from the substantial portion of the particular ones of the fields are delayed relative to the remaining color component of the substantial portion of the same field.

27. A method of recording fields of color information composed of color components on a black and white separation master and with the fields of color information occurring at a particular field rate including the steps of:

producing signals representing repeating color group from a substantial portion less than a full field of particular ones of the field of color information and wherein each group includes color components from the substantial portion of the same field, recording the signals on a separation master as a plurality of successive frames and with each frame representing a different one of the color components and with the separation master recorded at a frame rate different than the field rate of the color information, and producing a color print from the separation master wherein each of the color groups is used in the production of a frame of the color film.

28. The method of claim 27 wherein the step of recording the separation master includes recording at the same time a plurality of frames of the separation master.

29. The method of claim 27 wherein the signals representing a repeating color group are produced from a substantial portion less than a full field of particular ones of the fields of color information and wherein the step of recording the separation master includes sequentially recording successive frames of the separation master.

* * * * *